Dec. 9, 1969  N. BEN-TOVIM  3,482,905
PROJECTION PERIMETER
Filed Oct. 22, 1965  2 Sheets-Sheet 1

INVENTOR
NATHAN BEN-TOVIM
BY
ATTORNEY

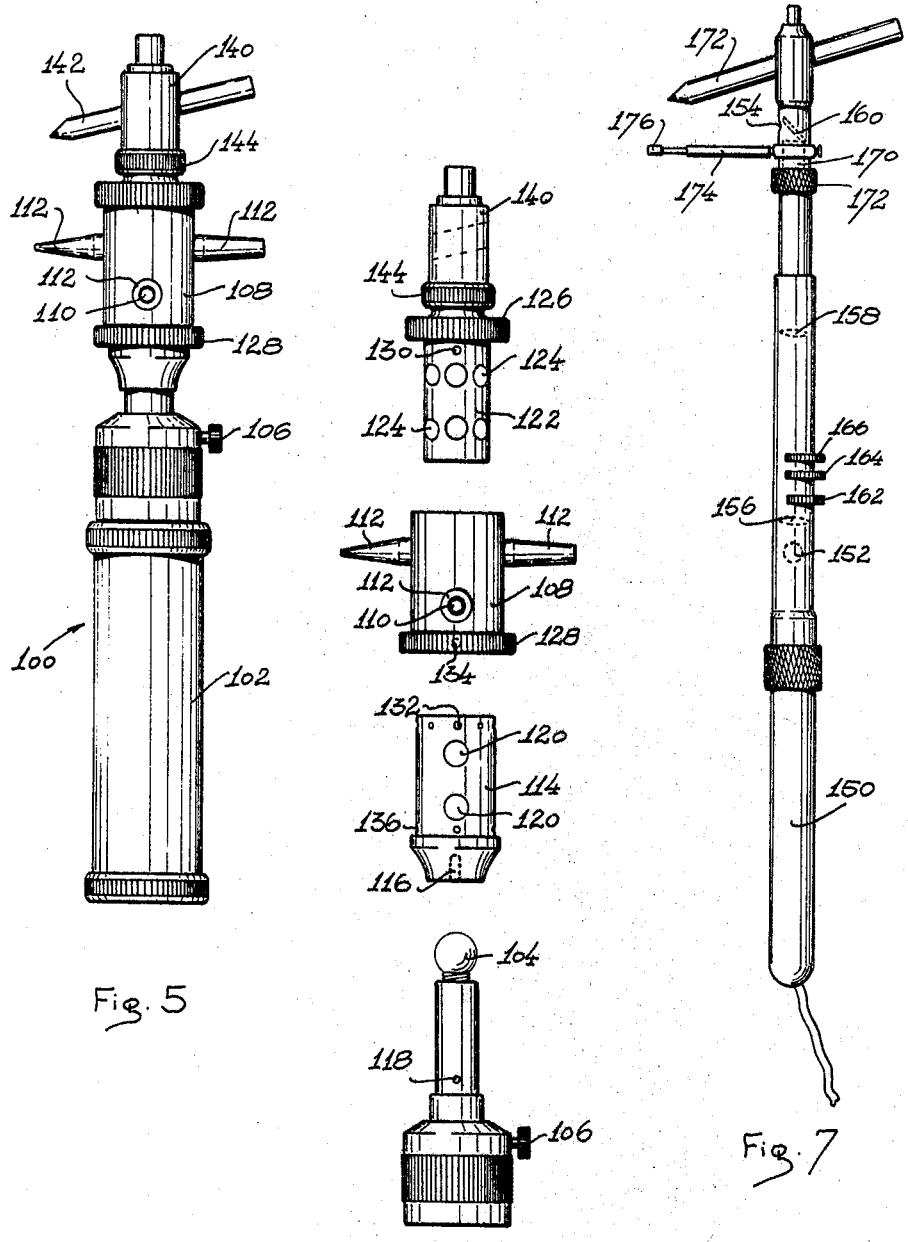

United States Patent Office 3,482,905
Patented Dec. 9, 1969

3,482,905
PROJECTION PERIMETER
Nathan Ben-Tovim, 18 Weisel St., Tel Aviv, Israel
Filed Oct. 22, 1965, Ser. No. 500,995
Int. Cl. A61b 3/02
U.S. Cl. 351—23        19 Claims

ABSTRACT OF THE DISCLOSURE

A projection perimeter comprises a flat translucent screen for examining the central field of vision and having a central opening, an arc carrying a translucent screen for examining the peripheral field of vision rotatably mounted at the central opening of the first screen, and a light projector movable by the examiner along the rear side of the screens for causing a luminous dot to be seen by the subject at the front side of the screens during the examination.

---

The present invention relates to projection perimeters for use in visual field examinations.

In examining the eye with a perimeter for determining the field of vision, the subject is directed to fix a prescribed central point, called the fixation point, while a target or stimulus is moved along different meridians, the subject all the while informing the examiner where the target begins to be seen or ceases to be seen by the eye. The central and peripheral fields of vision may be tested in this manner. Many types of instruments have been devised but, as a rule, those that are reasonably accurate are quite bulky, complicated, and costly to produce; while those that are simple in construction, are usually not very accurate.

An object of the present invention is to provide a novel projection perimeter which enables an accurate examinaiton to be performed, and yet which may be constructed so as to be relatively simple, inexpensive, compact, and conveniently portable from place to place.

A further object is to provide novel light projectors which are particularly useful in the foregoing optical device.

The novel optical device comprises, generally, a flat screen for examining the central field of vision, an arc for examining the peripheral field of vision, the arc having a concavity adapted to face the subject's eye and extending outside the outer preiphery of the flat screen, the screen being formed with an opening at the center thereof enabling the examiner to see the subject's eye during the examination, and means for rotatably mounting the arc to the screen at the central opening thereof. Certain novel aspects of the invention are directed to the mounting of the arc at the center of the screen. Other novel aspects are directed to the arrangement for transmitting to the subject's eye diffused light, and yet further novel aspects are directed to features of the projectors which may be used for producing the luminous target on the screen and arc during the eye examination.

Further objects and features of the invention will be apparent from the description below.

The invention may take a number of forms, but is herein described, by way of example only, with reference to the accompanying drawings, in which:

FIGS. 5 and 6 are, respectively, a side elevational view and a partial exploded view of a projector which may be used with the perimeter; and FIG. 7 is a side elevational view of another projector which may be used with the perimeter.

Figures 1, 2, 3, 4:
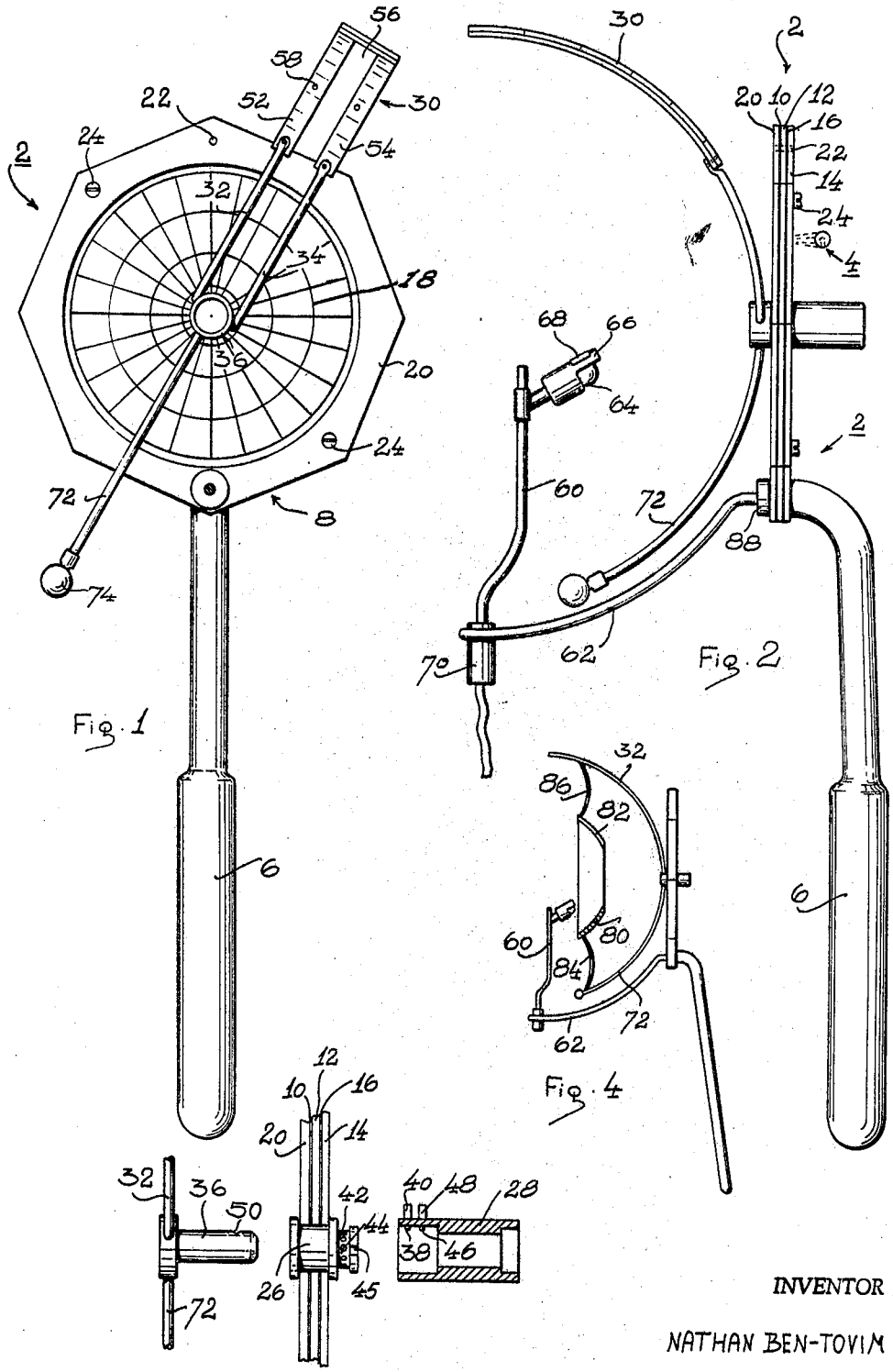
FIG. 1 is a front elevational view of a hand projection perimeter constructed in accordance with the invention, but with the lamp removed for purposes of clarity.
FIG. 2 is a side elevational view of the device of FIG. 1.
FIG. 3 is a longitudinal sectional view of the mounting of the arc to the screen in the device of FIGS. 1 and 2.
FIG. 4 illustrates a variation, namely the use of an annular reflector for illuminating the subject's eye, which variation may be used in the perimeter of FIGS. 1 and 2.

With reference first to FIGS. 1 and 2, the complete perimetric instrument comprises a hand perimeter, generally designated 2, and a projector, generally designated 4 in FIG. 2, for producing a luminous target on the screen of the perimeter. FIGS. 5–7 illustrate two forms of projectors that may be used.

The hand perimeter 2 includes a handle 6 secured to a screen assembly generally designated 8. The latter comprises a translucent screen of paper or the like 10 and a pair of rigid transparent plates 12 and 14 between which is disposed a thin sheet of transparent plastic 16 in the form of a positive film carrying a graduated surface containing markings 18 indicating the different meridians, etc. A circular ring 20 on the front side of the assembly holds the paper in place, the complete assembly being secured together by screws 22. At the back side of the screen assembly, plate 14 carries a pair of pins 24 which are used for mounting a celluloid or light transparent sheet (not shown) which receives the markings by the examiner during the examination.

A central opening is formed in the screen assembly 8, and a hollow grommet or sleeve 26 (FIG. 3) is fastened within this opening. An eye piece 28 is removably carried by sleeve 26 at the back side of the screen assembly. If desired, a suitable optical system may be housed within the eye piece. During the examination, the examiner looks through the eye piece to observe the subject's eye being examined.

An arc 30 is mounted to the center of the screen. This mounting is such that the arc may be readily removed and may also be rotated about the central axis of the screen. The arc 30 is carried at the end of a pair of curved narrow rods 32 and 34 which are spaced apart so as to leave clear the screen between them. The rods are attached to a sleeve 36 adapted to be mounted within sleeve 26 and eye piece 28.

For mounting these elements, eye piece 28 is provided with a first depressible ball 38 biased by a spring within a small container 40 and adapted to seat in one of a plurality of recesses 42 formed within an annular groove 44 in sleeve 26. The latter sleeve is formed with an axial slot 45 which permits the ball 38 to pass axially along the sleeve until it reaches annular groove 44. The eye piece 28 is formed with a second depressible ball 46 biased by a spring within a small container 48 adapted to seat within a recess 50 formed on sleeve 36 which carries the arc 30.

The foregoing elements are assembled by first applying eye piece 28 to sleeve 26 of the screen assembly so that ball 38 seats in one of the recesses 42. Sleeve 36 is then inserted within sleeves 26 and eye piece 28 until ball 46 of the latter seats in recess 50. The spring acting on ball 46 is heavier than that acting on ball 38, so that when the arc 30 is rotated, the eye piece 28 will rotate with sleeve 36 while ball 38 moves from one recess 42 to another to releasably hold the arc in position. The arc may be readily removed from the screen assembly by pulling it out, causing sleeve 36 to unseat its recess 50 from ball 46.

Arc 30 is mounted so that its concavity faces the subject's eye and extends outside the outer periphery of the graduated surface 18 of the screen assembly. The arc comprises two curved plates of transparent plastic, each being U-shaped and formed with a pair of spaced legs 52 and 54. A translucent arc screen 56, preferably consisting of a sheet of translucent paper, and a transparent plastic film formed with the arc markings, are supported between the two transparent plates with the arc markings viewable through the posterior transparent legs, the space between the two legs 52 and 54 serving for the luminous target. The foregoing elements are secured together by screws 58 and are supported by rods 32 and 34.

The radius of arc 30 is equal to the distance between the center of the flat screen 8 and the subject's eye under examination. The subject's eye is located at a fixed distance from the center of the screen, preferably 15 cm., by means of a vertical rod 60 carried at the end of a curved rod 62 attached to screen assembly 8. The graduated markings 18 of the flat screen assembly 8, used in measuring the central field of vision, extend from approximately 0–30°; while the arc 30, used in measuring the peripheral field of vision, extends from approximately 30° to at least 90°.

To provide background lighting during the eye examination, a lamp 64 is attached to the upper end of vertical rod 60 and carries a light shield 66. The latter shield is provided with a translucent window 68 to transmit diffused light to the subject's eye so that the eye can be seen by the examiner, as the light reflected from the screen is not suffcient to illuminate the subject's eye. Vertical rod 60 carrying the lamp is mounted to supporting rod 62 by means of sleeve 70. The lower part of rod 60 near the end received in sleeve 70 is offset as shown in FIG. 2, so that when the rod 60 is swiveled in sleeve 70, the lamp 64 is pivoted laterally to one side. In its normal position, the lamp would block the view of the arc at about the 270° position at the arc, and therefore when the eye is being examined at this position of the arc, the lamp is pivoted laterally to unblock the view of the arc.

To facilitate the rotation of arc 30 for testing the different meridians in the peripheral field of vision, a rod 72 is attached to sleeve 36 carrying the arc, and a weight 74 is applied at the end of rod 72. The latter rod may serve as a handle for rotating the arc, and weight 74 acts as a counter-weight for the arc.

A variation in the arrangement for transmitting to the subject's eye diffused light in addition to that reflected from the screen is shown in FIG. 4. In this variation, an annular reflector 80 is provided between the subject's eye and the screen. This reflector is mounted by supports 86 and 84 between the arc 30 and rod 72, so as to rotate with the rotation of the arc 30. The opening in reflector 80 is large enough so as not to obscure the viewing of the flat screen markings 18. In addition, the reflector is formed with a radial slot 82 in alignment with arc 30 so as not to obscure the viewing of the arc.

Preferably, handle 6 and rod 62 are both also removable from the screen assembly 8 (as for example by unscrewing threaded collar 88) so as to permit the perimeter to be conveniently disassembled, stored, transported, and reassembled.

In use, the subject places his eye just above the upper end of vertical rod 60 (in FIGS. 2 or 4) and fixes the central opening in the flat screen assembly 8. The examiner looks through eye piece 28 at the opposite side of the perimeter and observes the subject's eye. During the examination, the examiner moves the luminous target 4 along the different meridians of the flat screen 8 at the rear side thereof, for testing the central field of vision, and along the rear side of the arc screen 56 for testing peripheral field of vision, the arc being rotated for testing the different meridians in the peripheral field of vision. As the luminous target or dot 4 is moved by the examiner, the subject informs the examiner the instant it begins to be seen or ceases to be seen on the screen, and the examiner records this information by marking a dot on the back of the celluloid or light transparent sheet carried by the pins 24 of the screen assembly. As for the peripheral field, dots are also made upon the same transparent sheet in a space that would be provided thereon for applying the markings relating to the peripheral field, i.e. 30–90°, covered by the arc. That is to say, the transparent sheet on pins 24 would not extend beyond the physical limits of the flat screen, but the markings relating to the peripheral field examination would be made on that sheet in a different manner, such as by a different colour or different form of marking, to distinguish between the markings relating to the central field examination. After one eye examination is completed, the examiner removes the celluloid sheet, and places another one on the screen for recording the results of the second eye examination. Then the celluloid sheets are placed under the final record charts, made of translucent paper. The markings are transferred, and the celluloid sheet may be washed and used again.

One form of light projector (represented by the reference numeral 4 in FIG. 2) for producing the luminous target is shown in FIGS. 5 and 6. This light projector, generally designated 100, comprises a housing including a battery case 102 carrying a lamp bulb 104 at the upper end, the bulb being energized by a rotatable switch 106.

A sleeve 108 is rotably mounted to the housing and is formed with a plurality of windows 110 each opening into an elongated tube 112 projecting outwardly of the housing and adapted to contact the flat screen assembly 8 or the arc 30, for spacing the projector from these elements. The free ends of the tube 112 are formed with different size openings so that different size light dots can be produced on the screen. The windows 110 are staggered, as shown in FIGS. 5 and 6, so that the tubes 112 will not interfere with each other or with the examiner's view of the position of the light dot during the examination.

A further sleeve 114 is press-fitted into the top of battery case 102 and supports sleeve 108, sleeve 114 being disposed between the latter sleeve and the lamp 104. Sleeve 114 is provided with a longitudinal slot 116 adapted to receive a pin 118 carried by the battery casing 102, enabling the sleeve to be raised or lowered a limited amount while preventing its rotation. The latter sleeve is further formed with a pair of openings or windows 120 adapted to be selectively positioned in line with lamp 104 for directing the light from the latter either through the upper or through the lower windows 110 in sleeve 108. A further sleeve 122 is inserted between sleeve 114 and the lamp 104, this sleeve being formed with a plurality of different intensity and color filters 124 arranged in two groups, one above the other as shown.

The arrangement is such that sleeve 114 may be raised or lowered to position its upper or lower opening 120 in alignment with bulb 104, and sleeve 108 may be rotated to position one of the tubes 112 in alignment with the opening 120 receiving the light from bulb 104. The tube 112 through which the light is received determines the size of the luminous dot on the screen. To change the intensity or the color of the luminous dot, sleeve 122 is rotated to position the appropriate filter 124 behind the window 110 and opening 120 aligned with lamp 104.

Sleeve 122 is provided with a knurled ring 126 to facilitate its rotation, and sleeve 108 is provided with a knurled ring 128 to facilitate its rotation. In addition, sleeve 122 is provided with a ball 130 adapted to seat within one of a plurality of positional detents 132 formed on the inner surface of sleeve 114, and sleeve 108 is provided with a ball 134 adapted to seat in any one of a plurality of positional detents 136 formed on the outer surface of sleeve 114.

A cap 140 is attached to the inner sleeve 122, this cap being formed with an opening and carrying a marking implement 142 which is used by the examiner to mark the celluloid sheet during the examination. Cap 140 is rotatably mounted on sleeve 122 and is formed with a knurled ring 144 to facilitate this rotational movement in order to readjust the pen when sleeve 122 has been rotated.

A different type of projector is illustrated in FIG. 7. This projector is provided with a housing 150 having a light source 152 and an optical system for projecting a beam of light from the housing through an opening 154 at its upper end. The optical system includes a condenser lens 156, a projector lens 158, and a reflecting mirror 160. In addition, it includes a plurality of rotatable discs 162, 164 and 166 between the condenser and projector lenses. Disc 162 is formed with a plurality of different size windows for varying the size of the light beam; disc 164 is provided with a plurality of different intensity filters; and disc 166 is provided with a plurality of different colored filters. Thus, by adjusting discs 162, 164 and 166, the size, intensity and color of the light beam issuing through opening 154 may be varied. Mirror 160 is carried by an upper sleeve 170 rotatably mounted inside housing 150 and formed with a knurled ring 172 for accurately positioning the mirror. In addition, housing 150 carries the marking implement 172 which is used for marking during the examination.

For spacing the projector from the screen during the examination, the projector is provided with a finger 174 at the upper end of the housing just below the window 154. The spacing finger is formed with a depressible tip 176 which enables the tip of the marking implement to be brought against the record medium for marking a dot thereon during the course of the examination. Mirror 160 may be adjusted by means of knurled ring 172 so that the dot applied by marking implement 172 will coincide with the luminous dot produced on the screen from opening 154.

While a portable perimeter has been illustrated, it will be appreciated that the invention could be embodied in a larer, non-portable unit.

I claim:

1. An optical device for examining the field of vision of an eye, comprising: a flat screen for examining the central field of vision; an arc carrying an arc screen for examining the peripheral field of vision; said arc and arc screen having a concavity adapted to face the subject's eye and extending outside the periphery of the flat screen; both said flat screen and arc screen being translucent and carrying graduate markings: said flat screen being formed with a central opening enabling the examiner to observe the patient's eye during the examination; means for mounting to the rear side of said flat screen a removable transparent sheet for receiving the examination markings; a rotatable support mounting said arc and arc screen to said flat screen at the center opening of said flat screen; and a light projector movable by the examiner along the rear side of said screens for causing luminous dots to be seen by the subject at the front side of the screens; said projector carrying marking means for marking the examination results on the removable transparent sheet.

2. A device according to claim 1, wherein said last-mentioned means includes a mounting member rotatably mounted at the center of the flat screen and carrying the arc at one end thereof, the portion of said member carrying the arc comprising two narrow rods spaced apart so as to leave clear said flat screen between them.

3. A device according to claim 2, wherein the end of the mounting member opposed to the arc carries a weight acting as a counter-balance for said arc.

4. A device according to claim 2, wherein the end of the mounting member opposed to the arc is extended and serves as a handle facilitating rotation of said arc.

5. A device according to claim 1, wherein said arc mounting means includes a ball and detent arrangement between said mounting means and the center opening of said flat screen for releasably holding the arc in any one of its rotated positions.

6. A device according to claim 1, further including means for locating the subject's eye a fixed distance from said flat screen, a light source for illuminating the flat screen and arc, and means for transmitting to the subject's eye diffused light in addition to that reflected from said screen.

7. A device according to claim 6, wherein said light source comprises a lamp and a light shield directing the light from the lamp toward the flat screen, and wherein said diffused light transmitting means comprises a translucent window formed in said light shield and adapted to transmit diffused light to the subject's eye.

8. A device according to claim 6, wherein said diffused light transmitting means comprises an reflector disposed between said light source and said flat screen.

9. An optical device for use in examining fields of vision of the human eye, comprising, a translucent screen having an opening in the center thereof, means for locating the subject's eye a fixed distance from said screen, a light source for illuminating the screen, a light projector movable by the examiner along the rear side of said screen, while observing the subject's eye through the central opening, for causing a luminous dot to be seen by the subject at the front side of the screen and means for transmitting to the subject's eye diffused light from said light source in addition to that reflected from said screen.

10. A device according to claim 9, further including a handle attached to said screen for manually holding said screen.

11. A device according to claim 9, wherein said projector comprises a housing, a lamp disposed therein, spacing means carried by said housing adapted to be brought into contact with said screen for spacing said projector from the screen, and means for varying the size of said light dot.

12. A device according to claim 11, wherein said last-mentioned means comprises a sleeve having a plurality of windows rotatably mounted with respect to said light source to selectively present the windows in alignment with the light source, and an elongated tube connected with each of said windows and projecting outwardly of said housing, each of said tubes having a different size hole at the free end thereof.

13. A device according to claim 12, further including a second rotatable sleeve interposed between said light source and said first-mentioned sleeve and carrying filters of different intensity and of different color for varying the intensity and color of the light dot.

14. A device according to claim 11, further including a marking implement carried by said housing.

15. A device according to claim 11, wherein said spacing means comprises a spacing finger having a depressible tip.

16. A device according to claim 11, wherein said means for varying the size of the light dot comprises a rotatable disc having a plurality of different size windows.

17. A device according to claim 16, further including a second rotatable disc having a plurality of different intensity filters for varying the intensity of said light dot, and a third disc having a plurality of different color filters for varying the color of said light dot.

18. A projector particularly useful in an optical device having a screen for examining fields of vision, comprising, a housing, a lamp disposed within the housing, a first sleeve rotatably mounted on the housing and formed with a plurality of windows, said sleeve being rotatably mounted with respect to said lamp to selectively present the windows in alignment therewith, an elongated tube connected with each of said windows and projecting outwardly of said housing, each of said tubes having a different size hole in the free end thereof so as to permit variation in the size of said light dot, each of said tubes being adapted to contact the screen for spacing the projector from the screen, and a second rotatable sleeve disposed between said first sleeve and said lamp and carrying filters of different intensity and of different color for varying the intensity and the color of the light dot.

19. A light projector particularly for use in an optical device having a screen for examining fields of vision, comprising, a housing having a light source and an optical system for projecting a beam of light in said housing to produce a light dot on the screen of the optical device, said optical system including a first rotatable disc having a plurality of different size windows for varying the size of the light beam, a second rotatable disc having a plurality of different intensity filters for varying the intensity of the light beam, and a third disc having a plurality of different color filters for varying the color of the light beam, a marking implement carried by said housing, and a finger carried by said housing for spacing the projector from the screen, the tip of said finger being depressible to enable the marking implement to be used for marking said screen.

References Cited

UNITED STATES PATENTS

| | | | |
|---|---|---|---|
| 2,837,964 | 6/1958 | Gambs | 351—24 |
| 3,025,755 | 3/1962 | Koetting. | |
| 654,346 | 7/1900 | Graham | 351—23 |
| 1,115,408 | 10/1914 | De Zeny | 351—23 |
| 1,721,208 | 7/1929 | Currier et al. | 351—23 |
| 2,036,181 | 3/1936 | Mendelsohn et al. | 351—32 X |
| 2,576,358 | 11/1951 | Pritikin | 351—32 X |
| 3,269,792 | 8/1966 | Mirsky | 351—30 X |

OTHER REFERENCES

Max Poser, "The Perimeter," Optical Journal and Review of Optometry, Jan. 1, 1945, pp. 23, 24 and 38.

Bausch & Lomb Equipment for Field Studies, 1949, Booklet.

DAVID SCHONBERG, Primary Examiner

P. A. SACHER, Assistant Examiner

U.S. Cl. X.R.

351—24, 30, 32, 36, 37, 1